United States Patent [19]

Morishita

[11] 4,095,756
[45] Jun. 20, 1978

[54] BAIL LATCHING AND RELEASING MECHANISM FOR OPEN-SPOOL SPINNING REEL

[75] Inventor: Yasomatsu Morishita, Kure, Japan

[73] Assignee: Ryobi, Ltd., Fuchu, Japan

[21] Appl. No.: 753,162

[22] Filed: Dec. 21, 1976

[30] Foreign Application Priority Data

Dec. 27, 1975 Japan .............................. 50-177565

[51] Int. Cl.$^2$ ............................................ A01K 89/01
[52] U.S. Cl. ................................................ 242/84.2 G
[58] Field of Search ................... 242/84.2 G, 84.21 R, 242/84.21 A, 84.2 A, 84.2 R

[56] References Cited

U.S. PATENT DOCUMENTS

| | | | |
|---|---|---|---|
| 2,498,987 | 2/1950 | Duncan | 242/84.21 R |
| 2,713,463 | 7/1955 | Sarah | 242/84.21 R |
| 4,005,832 | 1/1977 | Yamazaki | 242/84.21 R |

*Primary Examiner*—Billy S. Taylor

*Attorney, Agent, or Firm*—Sughrue, Rothwell, Mion, Zinn and Macpeak

[57] ABSTRACT

One end of a spring loaded bail wire 13 is secured to a pivotally mounted lever arm 3 having an arcuate cam projection 4 of tapering radius provided with a recess 18. The cam projection is surrounded by a circular extension 7' on one end of a spring biased slider 7 mounted in a support block 2 integral with the reel rotor 1 A follower projection 17 on the inner surface of the circular extension engages the cam projection, and is configured to mate with the recess to latch the bail in its cocked position. Upon rotation of the rotor the projecting slider strikes a fixed slider kick member 14, and is cammed inwardly thereby to unseat the projection from the recess and release the cocked bail. The two spring forces increasingly offset each other during the bail return, to thereby inplement a smooth and quiet tripping operation with a very low slider impact against the fixed kick member.

9 Claims, 3 Drawing Figures

BAIL LATCHING AND RELEASING MECHANISM FOR OPEN-SPOOL SPINNING REEL

BACKGROUND OF THE INVENTION

This invention relates to a bail latching and releasing mechanism for an open spool spinning reel.

The typical prior art bail mechanism comprises bail arm levers whose ends are secured to supporting blocks provided at symmetrical positions outside of the rotor. One bail arm lever is biased in the bail release or rewind direction by a torsion spring. The other bail arm lever engages an outwardly biased slider mounted in the supporting block, such that the slider latches the lever arm in the bail cocked or line-out position. When the rotor is turned the protruding slider strikes a slider kick mounted on the reel body to cam the slider inwardly and thereby release the latched lever arm, which returns the bail to its rewind position.

While being generally serviceable, such a conventional mechanism is disadvantageous in that when the bail is released to return to its rewind position, a severe shock is generated in the reel structure, which causes the reel to vibrate and accelerates wear and loosening.

SUMMARY OF THE INVENTION

An object of this invention is to provide an automatic kick type of bail latching and releasing mechanism in which the shock caused by the slider striking the slider kick when the bail is released is extremely small.

Another object of the invention is to provide a bail release mechanism capable of preventing reel vibration and smoothly implementing the line winding operation, especially the initiation thereof.

A still further object of the invention is to provide a bail latching and releasing mechanism which can be easily adapted to or retrofitted in a conventional automatic kick type of bail mechanism with only slight modification, thereby reducing the manufacturing and retooling costs.

DETAILED DESCRIPTION OF THE PREFERRED EMBODIMENT

Figure 1:
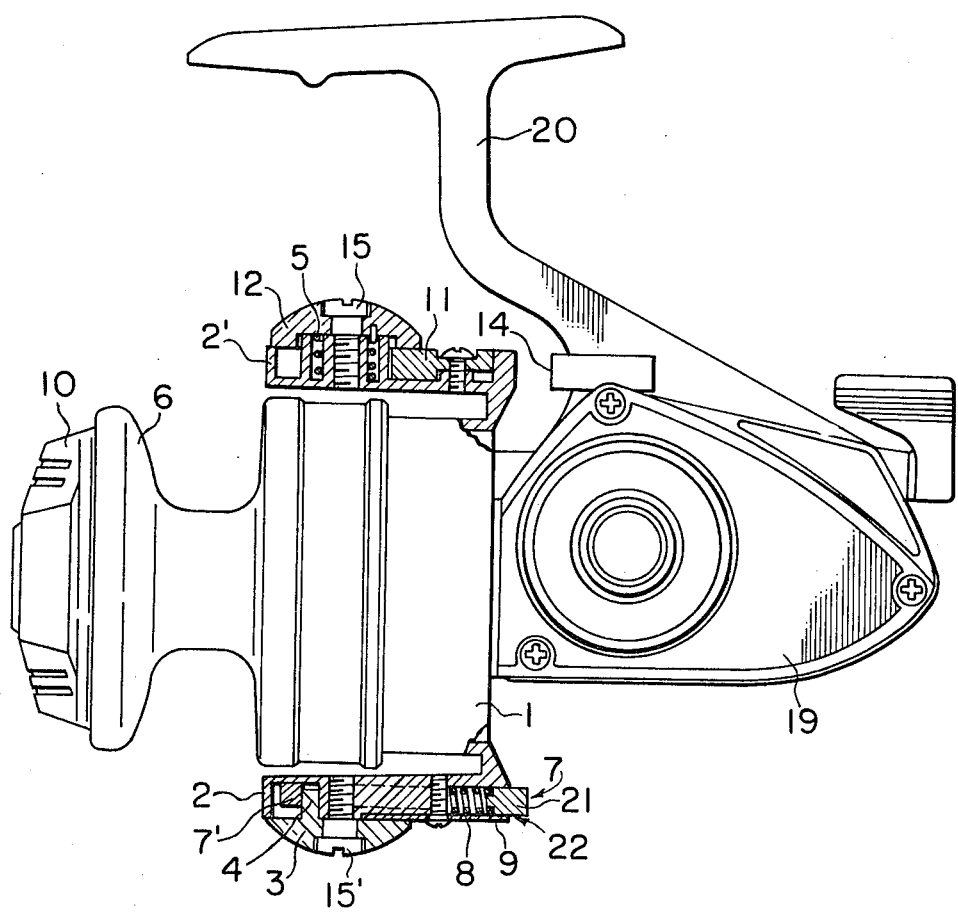
FIG. 1. is a side view, with some parts shown in vertical section, of an open-spool spinning reel according to the invention.

FIG. 1 shows an open-spool spinning reel comprising a rotor 1 mounted on a tubular shaft (not shown) journalled in a body 19. A pinion secured to the tubular shaft engages a main gear fixed to the shaft of a reel handle. The rotor 1 is turned by operating the handle. A spool 6 is slidably engaged with the rotor by means of an adjustable drag knob 10 screwed onto the end of a main shaft.

Supporting blocks 2 and 2' are integrally formed with the rotor 1 at diametrically opposite positions thereon. A bail arm 12 is secured to the supporting block 2' by a shouldered pivot screw 15, and a spring member 5, preferably a torsion spring, rotationally biases the arm 12 toward the bail rewind position. A counterbalance weight 11 is mounted on the support block 2' to prevent any eccentric rotation of the rotor.

Figure 2:
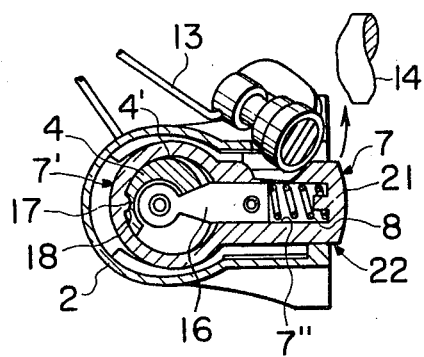
FIG. 2 is a sectional view illustrating the essential parts of a bail latching and releasing mechanism according to the invention, showing the bail in the cocked position.
Figure 3:
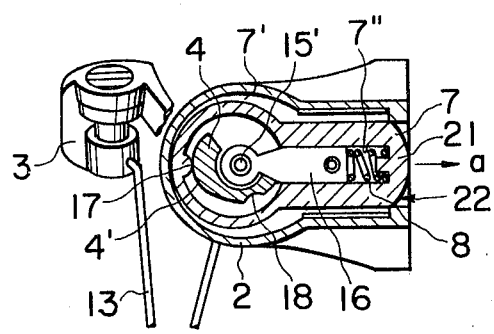
FIG. 3 is a sectional view similar to FIG. 2, but showning the bail in the released position.

As is shown in FIGS. 1 - 3, the supporting block 2 has a rear opening 22. An elongated protruding member 16 extends upwardly from the supporting block 2, and engages a longitudinal slot 7" in a slider 7. A spring 8 is disposed between the end of the protruding member 16 and the bottom of the slot 7", whereby the slider is urged in the direction of arrow a.

The outer rear end 21 of the slider 7 has an arc-shaped or inclined surface so that the slider 7 can smoothly impact a slider kick, to be described later, and be cammed inwardly thereby. The inner end of the slider is formed as an annular section 7' having a projection 17 extending toward the center thereof.

The end of the bail 13 engages a bail arm lever 3 which is pivotally attached to the end of the protruding member 16 in the supporting block 2, at the center of the circle, by a pivot screw 15'. A cam 4 is integral with the bail arm lever 3, and is accomodated within the annular section 7' of the slider 7.

The cam 4 has a curved surface 4' whose radius from the center of the screw 15' gradually increases in the circumferential direction. The length of the cam surface 4' is equal to or slightly longer than the stroke of the bail. A recess 18 is provided in the cam surface at the point where the radius is a minimum, which recess engages the projection 17. The amount of the radius change of the cam surface is determined by the required stroke of the slider.

When the bail 13 is cocked as shown in FIG. 2, the slider is moved backwards, in the direction of arrow a, by the spring 8 until the projection 17 seats in the recess 18 and the rear end 21 of the slider protrudes out of the opening 22 in the supporting block 2. The bail is latched in the cocked position against the restoring force of the torsion spring 5. On the other hand, when the bail is in the released position shown in FIG. 3, the slider is cammed forward against the force of the spring, and the rear end of the slider is receeded within the opening 22.

The amount of backward movement of the slider is not soley determined by the engagement depth of the projection 17 and the recess 18, and the engagement depth is therefore made as shallow as possible, and only as deep as is necessary to hold the bail in the cocked position. The projection 17 and the recess 18 are preferably semicircular in shape so that their engagement and disengagement can be achieved by only a slight movement of the slider.

The slider and spring member are enclosed by a cover 9 secured to the supporting block 2 with a screw.

Referring back to FIG. 1, a slider kick 14 protrudes from the base 20 of the body 19. The kick 14 is positioned so that the protruding slider strikes it when the rotor is turned. The slider kick preferably has a curved surface configuration to minimize the impact when the outer rear end 21 of the slider strikes it. It can also have a truncated pyramid surface section.

To release or pay out the fishing line the bail 13 is manually swung in a clockwise direction from the FIG. 3 to the FIG. 2 position, until the recess 18 becomes engaged with the projection 17. The slider is biased in the backward direction by spring 8, which maintains the projection 17 in latched engagement with the recess 18 in the cam surface 4'. The slider is moved backwards a distance corresponding to the radial displacement of the cam surface 4', and the rear end 21 of the slider is protruded from the opening 22 of the supporting block 2. The rotational force of the cam is smoothly translated to the backward movement of the slider by the radial displacement of the cam surface.

When the fishing line is to be retrieved and wound on the spool, the rotor 1 is spun by turning the handle. In association with the rotation of the rotor, the slider 7 is moved in a circumferential direction until its rear end 21 strikes the slider kick 14. This cams the slider forward to disengage the projection 17 from the recess 18. The released bail and cam are then rotated counterclockwise by the torsion spring 5, whereby the reel is returned to the rewind or retrieval state.

As the projection 17 slides over the cam surface 4′, the slider 7 is moved forward against the force of the spring 8 and returned to its retracted position where it does not further engage the slider kick.

The tripping or release of the bail may also be achieved by manually pressing the extended slider with a finger.

As is apparent from the foregoing description, in the bail latching and releasing mechanism according to the invention the forward and backward movements of the slider 7 are effected in response to the radial displacement of the cam surface 4 whose radius from the center of the bail arm lever gradually increases from one end to the other. The recess 18 at the minimum radius position of the cam and the slider projection 17 are adapted to engage each other and latch the slider in its cocked position. The latch engagement surfaces are minimized by this construction, whereby the engagement and disengagement of the recess and the projection requires only a very small force, which minimizes the impact caused when the slider strikes the slider kick. This effectively prevents reel vibration when the bail is tripped, which reduces wear and annoyance and implements a smooth and immediate initial rewind operation. Furthermore, since the force applied by the torsion spring 5 is increasingly countered or offset by that of the spring 8 as the latter is being compressed during the release swing of the bail, a very smooth and quiet tripping operation is achieved. In addition, the conventional bail mechanism can be easily modified to the mechanism according to the invention, which minimizes any retooling or retrofitting costs.

What is claimed is:

1. An automatic bail latching and releasing mechanism for an outer skirted spinning reel, comprising: a reel body (19), a slider kick (14) mounted on the reel body, a rotor (1) rotatably mounted to the reel body, a pair of supporting blocks (2,2′) provided at diametrically opposite positions outside of the rotor, a pair of bail arm levers (3, 12) pivotally secured to the respective supporting blocks, a bail wire (13) having its respective ends mounted on the bail arm levers, spring means (5) mounted proximate one of the bail arm levers for biasing the bail arm toward a released position, a slider (7) mounted in the supporting block mounting the other bail arm lever for linear movement with respect thereto, an annular opening in one end of the slider having a projection (17) thereon, a spring member (8) for biasing the slider outwardly from said supporting block, a raised, generally arcuate cam surface (4) on the other bail arm lever disposed within the annular opening in engagement with the slider projection, the cam surface having a gradually increasing radius and a recess (18) adapted to mate with the slider projection to latch the bail wire and slider at a cocked position, the cocked slider projecting out from its supporting block and striking the slider kick as the rotor is turned to release the cocked bail wire, whereby the return of the bail wire to its released position compresses the spring member to thereby oppose the return force of the spring means and reduce the bail wire return impact.

2. A mechanism as claimed in claim 1, wherein the slider comprises an elongated slot in the other end thereof, a protruding member on the other supporting block engages the slot in the slider, and the spring member is disposed between one end of the slot and one end of the protruding member.

3. A mechanism as claimed in claim 1, wherein the length of the cam surface is at least as long as the stroke of the bail wire from its cocked to its released position, and the recess is at the position where the radius of the cam surface is a minimum, so as to be most easily engaged and disengaged with the projection.

4. A mechanism as claimed in claim 2, wherein the length of the cam surface is at least as long as the stroke of the bail wire from its cocked to its released position, and the recess is at the position where the radius of the cam surface is a minimum, so as to be most easily engaged and disengaged with the projection.

5. A mechanism as claimed in claim 1, wherein the depth of the projection and recess is just sufficient to latch the bail wire in its cocked position.

6. A mechanism as claimed in claim 5, wherein the projection and the recess are semicircular in shape.

7. A mechanism as claimed in claim 1, wherein the outer rear end of the slider has an inclined surface.

8. A mechanism as claimed in claim 1, wherein the surface of the slider kick has a ramp shape.

9. A mechanism as claimed in claim 1, further comprising a counterbalance weight on the other supporting block for preventing the eccentric rotation of the rotor.

* * * * *